United States Patent Office 3,479,378
Patented Nov. 18, 1969

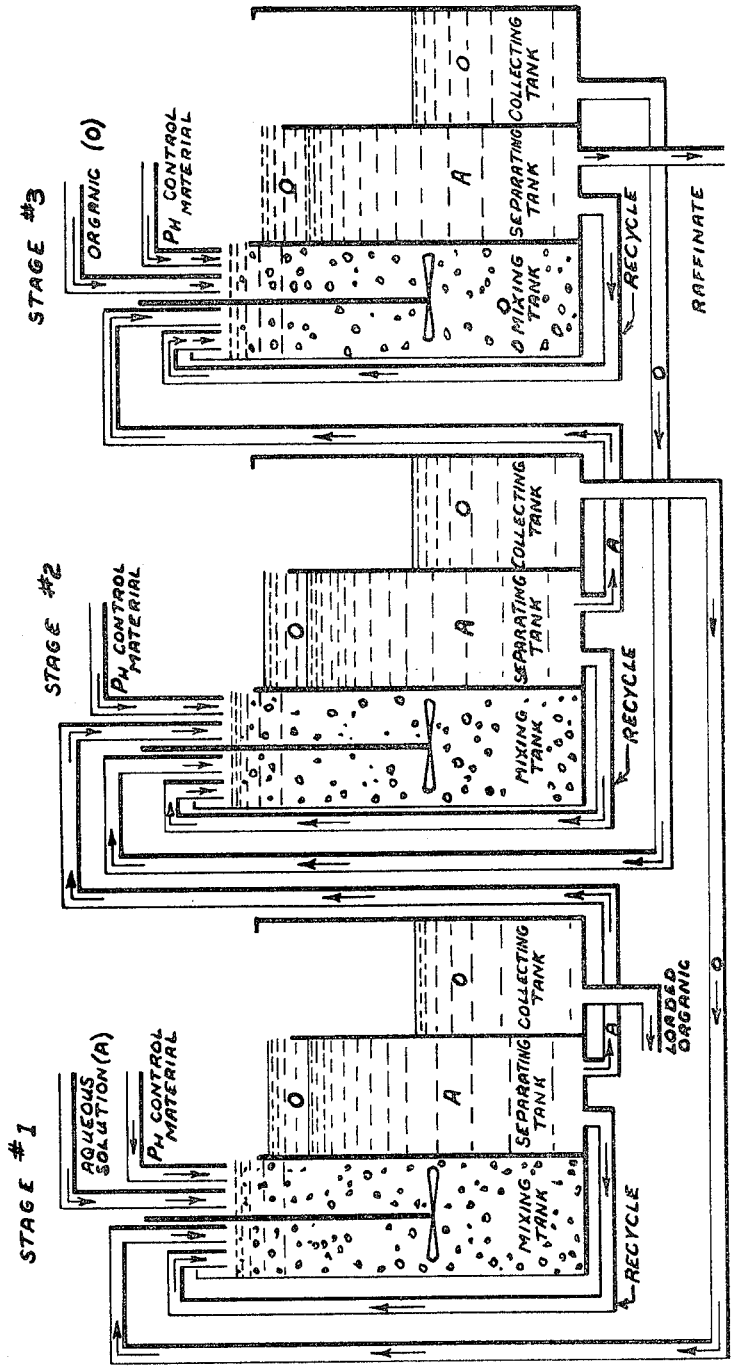

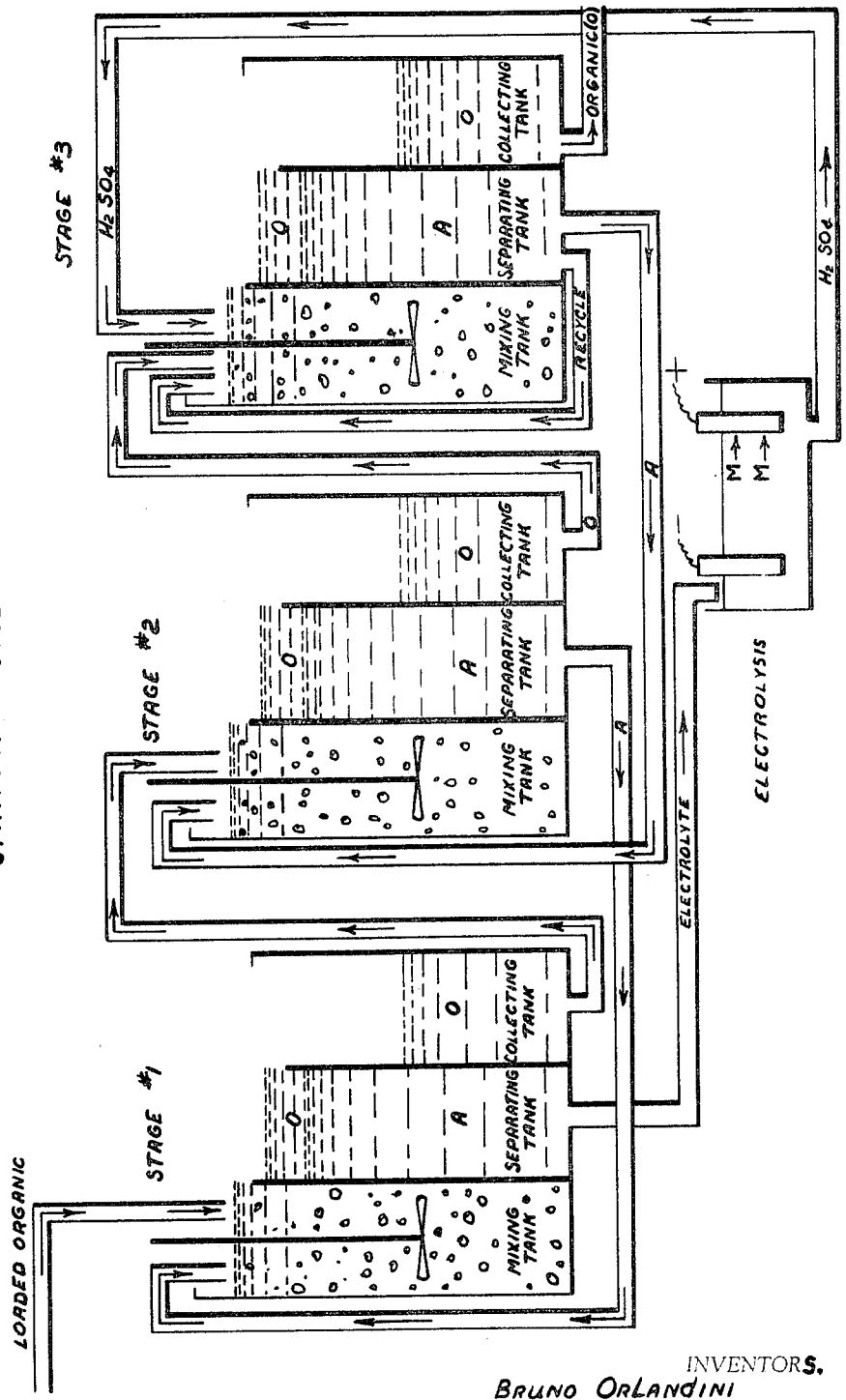

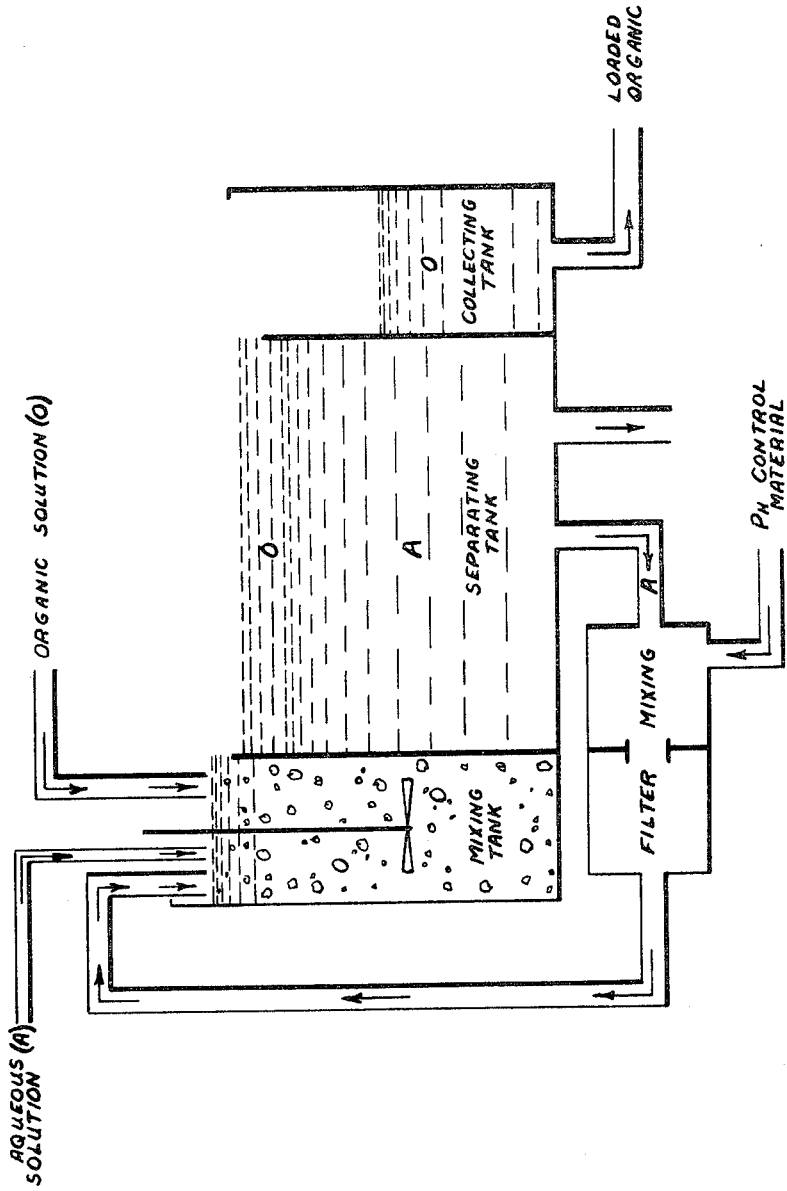

3,479,378
LIQUID ION EXCHANGE PROCESS FOR
METAL RECOVERY
Bruno Orlandini and Kenneth K. Kirkpatrick, Kellogg,
Idaho, assignors to Bunker Hill Company, a corporation of Delaware
Filed Nov. 6, 1967, Ser. No. 680,635
Int. Cl. C07f 3/06, 1/08; C22b 15/08
U.S. Cl. 260—429                                16 Claims

ABSTRACT OF THE DISCLOSURE

The disclosure describes a process for separating and recovering metallic values such as copper, zinc, manganese, cobalt and nickel from an aqueous solution. The solution is mixed with an aqueous insoluble organic phase containing an organic ion exchange extractant that is selective to the desired metallic value to extract the desired metallic value from the solution. The composite phase mixtures are permitted to separate to physically remove the metallic values from the solution. A portion of the aqueous phase is recycled back to the mixture to increase the exposure of the metallic values to the extractant. A pH control material is added to the recycled aqueous phase to maintain the pH of the aqueous solution substantially constant during the extraction reaction.

BACKGROUND OF THE INVENTION

This invention relates to hydrometallurgical processes for recovering metallic values and more particularly to liquid ion exchange processes for preferentially separating, recovering and purifying metallic values from aqueous solutions.

Considerable research has been devoted to seeking new techniques and processes for recovering metallic or mineral values contained in bulk flotation concentrates from base metal ores. Sulfide concentrates are generally subjected to standard roasting and leaching or autoclave leaching to solubilize many of the metallic values in an aqueous acid solution. Attempts have been made to develop processes that are commercially economical for selectively extracting one or more of the metallic values from the aqueous leach solution and concentrating and purifying the extracted values to the point that further processing is economically feasible. General Mills, Inc., for example, has developed a highly selective ion exchange reagent for separating copper values from iron and other impurities common to dump leach liquors. The process developed by General Mills, Inc. is disclosed in the U.S. Patent No. 3,224,873, issued Dec. 31, 1965. This process utilizes an alpha-hydroxy oxime reagent that is quite efficient in extracting copper values from an aqueous solution having copper values in concentration of less than 6 grams per liter of solution. If the copper concentration is considerably above 6 grams per liter of solution the extraction efficiency drops off rapidly. The following equilibrium equation illustrates the reaction that takes place, in which R represents the reagent:

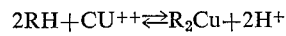

For each gram of copper extracted from the aqueous solution by the reagent one and one half grams of sulfuric acid are generated in the solution. Since the equilibrium of the reaction is pH sensitive, the extraction efficiency deteriorates with the generation of acid. When the aqueous solution contains more than 6 grams of copper per liter of solution, the acid generated by the reaction dramatically changes the equilibrium of the reaction to the point that it is no longer economical.

It has been suggested that varying amounts of sodium compounds, that are soluble in water, such as NaOH, NaHCO$_3$ and Na$_2$CO$_3$, be added to the copper aqueous solution for pH control to neutralize the acid as it is being generated. However, it was never thought possible that high efficiencies of copper extraction could be maintained on a continuous production basis for aqueous solutions containing above 40 grams of copper per liter of solution.

The Bureau of Mines of the United States Department of the Interior has conducted research on hte separation of copper and zinc in aqueous solutions by a liquid ion exchange reagent—di-2-ethylhexyl phosphoric acid. The di-2-ethylhexyl phosphoric acid is commonly referred to as EHPA. The EHPA reagent is highly zinc selective and has been used in removing zinc from a solution containing substantial amounts of zinc and copper. Copper may be extracted from the solution after the zinc has been removed. The extraction reaction is strongly pH dependent and is illustrated by the following equation in which EHPA represents the reagent:

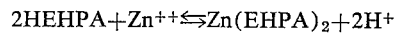

It has been found that the extraction efficiency decreases markedly below 2.5 pH.

Personnel of the Bureau of Mines have suggested that the acidity of the reaction can be controlled by an addition of lime to the organic phase to form a calcium salt which is illustrated by the following equation:

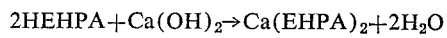

The calcium salt is mixed with aqueous solution in which gypsum (calcium sulfate) precipitates as illustrated:

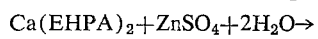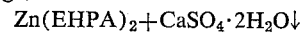

Personnel of the Bureau of Mines during laboratory tests were able to substantially selectively remove the zinc and copper from the aqueous leach solution utilizing a three stage, counter-current, mixer-settler arrangement. The sample solution contained 25.5 grams of zinc and 5.1 grams of copper per liter of solution. The results showed that 25.4 grams of zinc per liter of solution were removed from the solution during the zinc extraction cycle and 5.08 grams of copper per liter were removed during the copper extraction cycle after the zinc was removed.

Although the gypsum precipitate may not be particularly detrimental to the success of a laboratory experiment, it presents three principal problems when concerning the commercial process for recovering metallic values from a leach solution. One of the principal problems is that the precipitate settles to the bottom of the mixer and settler and must be periodically removed which may be quite inconvenient and expensive. Furthermore, as the precipitate descends towards the bottom, it takes with it some of the organic reagent which represents a substantial capital loss. The precipitate also has a tendency to migrate to the phase boundary between the aqueous phase and the organic phase thereby impeding the separation of the aqueous and organic phases causing the extraction efficiency to decrease.

One of the principal objects of this invention is to provide a new process for selectively extracting metallic values from aqueous leach solutions which is economical and readily adaptable for commercial production of metals.

An additional object of this invention is to provide an economical process for selectively extracting copper, zinc, manganese, cobalt, and nickel from an aqueous leach solution.

A further object of this invention is to provide an economical liquid ion exchange process that is capable of extracting concentrations of copper greater than 40 grams per liter of solution.

An additional object of this invention is to provide a commercially usable process for separating copper and zinc in which the pH control material does not detrimentally interfere with the extraction process.

These and other objects of this invention will become apparent upon the reading of the following description of a preferred and alternate embodiment of this invention.

BRIEF DESCRIPTION OF THE DRAWINGS

Several embodiments of this invention are illustrated in the accompanying drawings in which:

FIG. 1 is a schematic flow diagram illustrating the flow paths and equipment that may be utilized in performing the steps of this invention in extracting metallic values from an aqueous leach solution with an organic phase ion exchange liquid;

FIG. 2 is a schematic flow diagram of flow paths and equipment that may be utilized for stripping the metallic values from the organic phase liquid and recovering the metallic values from the stripping solution by electrolysis; and FIG. 3 is a schematic flow diagram illustrating the flow path and equipment that may be utilized for performing an alternate embodiment of this invention in extracting metallic values from an aqueous solution.

DESCRIPTION OF THE PREFERRED AND ALTERNATE EMBODIMENTS

Referring now to FIG. 1, there is shown a flow diagram for selectively extracting metallic values from an aqueous leach solution by contacting the solution with an immiscible organic ion exchange liquid containing an organic extractant that is highly selective. As shown in FIG. 1 the aqueous solution flows in one direction and the organic liquid flows in the opposite direction in a three stage, counter-current, mixer-separator arrangement. Specifically, the aqueous phase (A) flows from stage 1 to stage 3 and the organic phase (O) flows from stage 3 to stage 1.

In describing the process, the starting reference will be the aqueous solution flowing into the mixing tank in stage 1. The aqueous phase (A) is intimately mixed with the organic phase that flows from stage 2. The resulting mixture flows to the separating tank where the phases are permitted to separate with the organic phase floating on the aqueous phase. While the phases are being mixed and permitted to separate the organic extractant is interacting with the selected metallic values to remove the values from the aqueous phase. The extraction is accomplished by the exchange of ions in which the organic extractant gives up hydrogen ions for the selected metallic ions, thereby generating acid in the aqueous solution.

One of the principal steps of the invention is the recycling of a portion of the separated aqueous solution from the separating tank back to the mixing tank in the same stage to load up the organic extractant, i.e., to provide additional exposure to the metallic values with the organic extractant. Also, by recycling the aqueous phase greater control may be had of the process resulting in more consistent results and greater production.

An additional principal step of this invention, in conjunction with the recycling of the separated aqueous phase (A), is the addition of a pH control material to the aqueous phase to neutralize the acid generated in the extraction reaction. The combination of the steps of recycling the aqueous phase and adding the pH control material to neutralize the acid generated during the extraction reaction enables the user to economically selectively extract large concentrations of metallic values from aqueous solutions.

The portion of the aqueous phase (A) from the separation flows to the mixer in stage 2 where it is thoroughly mixed with the organic phase flowing from stage 3. The mixture from the mixing tank flows into the separating tank to permit the separation of the phases. Again a portion of the aqueous phase in the separator is recycled back to the 2nd stage mixer to increase the exposure of the metallic values with the organic extractant. A pH control material is added to the mixture to neutralize the acid generated by the extraction reaction. The portion of the aqueous phase in the separator that is not recycled, flows to the mixer in stage 3 where it is mixed with fresh organic phase liquid that contains little or no metallic values, or a portion of the neutralized recycle could be advanced to the succeeding stage. The separating of the phases, recycling of a portion of the aqueous solution and the adding of the pH material in stage 3 is similar to stages 1 and 2.

When the aqueous solution flows from the separator in stage 3 almost all of the selected metallic values have been removed therefrom. The aqueous solution without the extracted metallic values is frequently referred to as the raffinate of the process. Depending upon the nature and concentration of the metallic values remaining in the aqueous solutions, the raffinate may be further processed.

As previously mentioned the organic phase containing the organic extractant flows counter to the aqueous phase with the fully loaded organic solution flowing from the collecting tank in stage 1.

Fewer or more stages may be utilized as needed. The amount of selected metallic values extracted in each stage decreases exponentially until a point is reached where it is uneconomical to add further extraction stages. For example, during the extraction of copper values in a pilot operation with an aqueous solution having a copper concentration over 40 grams per liter of solution, it was found that 84.2% of the copper values were extracted in stage 1, 15.3% in stage 2 and 0.4% in stage 3. These high extraction efficiencies per stage show the results that may be obtained by utilizing this process invention to greatly reduce the number of stages required to extract the selected metallic values. The economic implications of these results are quite impressive.

The selection of the organic extractant depends upon the composition of the aqueous solution and principally upon the metallic values desired to be extracted from the aqueous solution. The selection of the pH control material depends upon a variety of factors, including its cost and availability.

It is desirable to maintain the mixture in the mixing tanks at stages 1 and 2 aqueous continuous to maximize the extraction efficiency by dispersing the organic phase in the aqueous phase. However, in stage 3 it is frequently desirable to maintain the mixture organic continuous to prevent the physical entrainment of the organic phase in the raffinate, thereby reducing the organic losses during the process. The regulation of the organic to aqueous rates may be readily accomplished by controlling the amount of aqueous solution that is recycled. This is another important advantage of the aqueous process step.

The metallic values contained in the loaded organic phase may be stripped from the organic phase and recovered by various methods. One particular method for efficiently stripping the loaded organic is illustrated in FIG. 2 in which the loaded organic is fed to a three stage, countercurrent, mixer-separator apparatus. The stripping liquid, generally an acid aqueous solution, is added to the third stage and moves in a counter flow direction to the loaded organic so that the organic phase with the least amount of metallic value is contacted with the strongest stripping liquid in stage 3. The organic phase with the maximum metallic value is contacted with the weakest stripping solution in stage 1.

If the selected metallic values are to be recovered by electrolysis, it is frequently desirable to use the spent electrolyte as the stripping aqueous solution.

The loaded organic phase mixed in the mixing tank stage 1 with stripping aqueous phase from stage 2 to reverse the extraction reaction and remove the metallic values from the organic extractant. The organic and aqueous phases are permitted to separate in the separating tank with the organic phase settling on the aqueous phase to physically remove the metallic values from the organic phase. The organic phase flows to the collecting tank where it is accumulated and then carried to stage 2 wherein it is mixed with the stripping aqueous solution from stage 3 to further strip any remaining metallic values from the extractant. From stage 2 the organic phase flows to the mixing tank of stage 3 where it is mixed with spent electrolyte having the highest acid concentration to strip any remaining metallic values from the organic extractant. The unloaded organic phase liquid from stage 3 is then processed back to stage 3 of the extraction cycle to again remove selected metallic values. The organic phase liquid may be considered as in a closed circuit with organic phase losses being made up as required.

The stripping aqueous phase solution flows counter to the organic phase progressing from stage 3 to stage 1. A portion of the aqueous phase in the separating tank in stage 3 is recycled to the mixing tank to allow more contact time and higher stripping efficiency. The ratio of the organic phase to the aqueous phase is preferably maintained greater than one, so that the mixtures will be organic continuous to minimize the organic entrainment in the aqueous phase. From the separating tank in stage 1, the aqueous stripping liquid containing the selected metallic values flows to storage facilities or directly to an electrolytic cell where the metallic values are removed from the electrolyte by the electrolysis process.

An alternate embodiment is illustrated in FIG. 3 in which the pH control material is added directly to the recycled aqueous phase from the separating tank to neutralize the aqueous solution before it flows back to the mixing tank. A settling or filtering system is mounted in the recycle circuit for removing any precipitate that may be formed when the pH control material is mixed with the recycled aqueous solution. The process of adding pH control material directly to the recycled aqueous solution has many advantages over adding the pH control material directly to the mixing tank. One of the advantages is that it provides a better and more precise control of the acidity of the aqueous phase and the equilibrium of the extraction reaction. Furthermore, it enables the removal of any precipitate that may be formed by the pH control material so that the precipitate does not interfere with the extraction reaction or phase separation within the settler. In this manner the pH control of the extraction reaction is controlled from outside the extraction cell.

Frequently, the aqueous solution contains substantial amounts of zinc and copper and lesser amounts of manganese, cobalt and nickel. Utilizing the instant process, each of these metallic values may be efficiently removed from the aqueous solution using various organic extractants for selectively extracting the particular metallic values desired.

COPPER EXTRACTION

In the selective extraction of copper from such an aqueous solution, an alpha-hydroxy oxime organic extractant of 5,8 - diethyl - 7 - hydroxydodecane-6-oxime (LIX-64) developed by General Mills, Inc. has been effectively used. The organic extractant is generally dissolved in an organic solvent of aliphatic or aromatic hydrocarbons such as kerosene or Napoleum 470. It has been found that an organic phase liquid of 6 to 20 volume percent organic extractant in the organic solvent is particularly effective. In the extraction of copper values of greater than 40 grams per liter of leach solution, it has been found that an organic phase to aqueous phase feed ratio of 1.8 to 1, including the aqueous recycle, is particularly effective.

EXAMPLE

Utilizing the instant process invention for selective extraction of copper values from an autoclave leach solution containing 47.5 grams of copper per liter of leach solution, it was found that 47.47 grams of the copper could be selectively extracted. The raffinate flowing from the 3rd extraction stage contained 0.03 grams of copper per liter of solution. The pH control material utilized during the process was ammonium hydroxide. During the test, 24.5 milliliters per minute of the aqueous leach solution was fed to stage 1 (FIG. 1) and 175 milliliters per minute of 20% LIX-64 organic phase liquid was fed to stage 3 (FIG. 1). The pH value of the aqueous feed was 3.0. From the separating tank, 80 milliliters per minute of aqueous phase were recycled back to the mixing tank and 24.7 milliliters per minute were advanced to stage 2. The aqueous phase advanced to stage 2 contained 7.5 grams of copper per liter of solution which means that 40 grams of copper were extracted by the organic extractant in stage 1. From the separating tank in stage 2, 90 milliliters per minute of the aqueous phase were recycled back to the mixing tank and 24.9 milliliters per minute of the aqueous phase were advanced to stage 3. The aqueous phase advanced to stage 3 contained 0.20 gram of copper per liter of solution and had a pH value of 2.6. The raffinate flowing from stage 3 contained 0.030 grams of copper per liter of solution and had a pH value of 2.3. The pH of the aqueous phase should be maintained between 2 and 4.

The large quantity and high efficiency of copper extraction is principally due to the addition of the pH control material and the recycling of the aqueous phase to increase the exposure of the copper values to the organic extractant. In this manner the process is capable of loading up the organic extractant to the maximum while maintaining high extraction efficiencies. Pure zinc oxide which is insoluble in water and soluble in acid, was successfully used as a pH control material in the copper extraction process illustrated in FIG. 1. The aqueous leach solution contained 42.6 grams of copper per liter of solution. After a 2-stage counter-current exposure to the LIX-64 organic liquid, 41.3 grams of copper per liter were removed. The use of pure zinc oxide has the added advantage that the zinc may be subsequently recovered and does not represent a total loss. Other pH control materials such as pure magnesium oxide may be utilized instead of ammonium hydroxide or pure zinc oxide.

The process shown in FIG. 3 should be utilized when the pH control material is likely to form a precipitate while neutralizing the aqueous acid solution. In this manner the precipitate may be effectively removed without interfering with the extraction reaction or phase separation. Impure alkaline compounds of magnesium and zinc may be used as pH control materials in this manner. Also, water soluble alkaline sodium compounds such as hydroxides, oxides and carbonates and water insoluble calcium compounds such as hydroxides, oxides and carbonates may be utilized.

ZINC EXTRACTION

The zinc may be readily extracted from an aqueous solution either before or after the copper is extracted by utilizing this process with a zinc selective extractant.

An organic extractant that may be effectively used for selectively extracting zinc from the aqueous leach solution is di-2-ethylhexyl phosphoric acid which is frequently referred to as EHPA. The organic extractant EHPA is dissolved in organic solvent such as kerosene. Isodecyl alcohol is used to facilitate the phase separation of the organic phase from the aqueous phase. It has been found that an organic phase liquid of 20 volume percent EHPA, 5% isodecyl alcohol and 75% kerosene is particularly effective. The zinc aqueous solution is processed through the extraction cycle from stage 1 to stage 3 whereas the organic phase EHPA is processed from stage 3 to stage 1 counter-current to the aqueous solution. Acid neutralizing material is added to the mixing tanks in stage 1, 2 and 3 to maintain the pH of the aqueous solution between 2.0 and 2.5. The zinc aqueous solution is recycled at each stage to increase the exposure of the zinc to the organic extractant. A particularly effective pH control material is the water insoluble, acid soluble compound-magnesium oxide which does not form a precipitate while neutralizing the aqueous solution. If the alternate process illustrated in FIG. 3 is utilized, alkaline materials of calcium, ammonia, magnesium, sodium may be utilized in which any precipitate that is formed is removed from the recycled zinc aqueous solution before the solution is mixed with the organic phase. In this manner, zinc may be commercially recovered utilizing this process to obtain high efficiencies while extracting large quantities of zinc from a leach solution.

Large zinc concentration and high efficiencies of zinc extraction have been obtained by maintaining the pH of the aqueous phase between 2.5 and 4.0.

MANGANESE EXTRACTION

It has been found that manganese may be extracted from an aqueous solution in which copper and zinc have previously been extracted by utilizing this process. The manganese may be effectively extracted by the organic extractant EHPA. For maximum efficiencies the pH value should be between pH 4 and 5.

COBALT EXTRACTION

Utilizing this process, it has been found that cobalt may be extracted from any aqueous solution efficiently and economically after the copper has been previously extracted by using the extractant 19-hydroxyhexatriaconta-9,28-diene-18-oxime commonly referred to as LIX-63. The pH value of the aqueous solution should be maintained approximately 6. The alkaline compounds of magnesium oxide and calcium oxide are good pH control materials for this purpose. The pH value of the aqueous solution may also be controlled by ammonium hydroxide. In an aqueous leach solution containing 0.97 gram per liter of cobalt, it was found that 81.4% of the cobalt could be extracted in the first extraction stage by an organic solution containing 10% LIX-63 in 90% Napoleum 470.

NICKEL EXTRACTION

Utilizing the same LIX-63 organic phase liquid it was found that by increasing the pH to approximately 7, substantial amounts of nickel could be extracted from the aqueous solution.

It should be understood that modification may be made in the instant process without departing from the scope of the invention.

What we claim as new and desire to protect by United States Letters Patent is:

1. In a liquid-liquid extraction process for recovering metallic values contained in an aqueous solution by mixing the aqueous solution with an aqueous insoluble organic phase liquid to form a mixture, said organic phase liquid containing an organic ion exchange extractant that is selective to said metallic values for extracting a portion of said metallic values from the aqueous solution and into the organic phase liquid and subsequently separating the organic phase liquid from the aqueous solution forming a metallic loaded organic phase liquid and a metallic unloaded aqueous solution, the additional steps of removing a prescribed portion of the metallic unloaded aqueous solution and recycling same back to the mixture, adding an acid neutralizing agent to the removed prescribed portion prior to recycling same back to the mixture, and removing any precipitate from the removed prescribed portion prior to recycling same back to the mixture.

2. In the process as defined in claim 1 wherein the acid neutralizing agent is added in sufficient amounts to maintain the pH value of the mixture substantially constant as the metallic values are extracted.

3. In the process as defined in claim 1 wherein the removed metallic unloaded aqueous solution is filtered to remove any precipitate after the neutralizing agent is added and prior to the recycling same back to the mixture.

4. In a process as defined in claim 2 wherein the acid neutralizing agent is selected from a group consisting of alkaline metal oxide, alkaline metal hydroxide, alkaline metal carbonates, alkaline earth oxides, alkaline earth hydroxides, alkaline earth carbonates, and ammonia.

5. In the process as defined in claim 1 wherein sufficient amounts of metallic unloaded aqueous solution are recycled to maintain the mixture aqueous phase continuous with the organic phase dispersed in the aqueous phase.

6. In the process as defined in claim 1 wherein the aqueous solution is an acid sulfate solution and the neutralizing agent added to the recycled portion is $CaCO_3$.

7. In a process as defined in claim 1 wherein the aqueous solution contains copper values and the organic ion exchange extractant includes an alpha-hydroxy oxime having a formula:

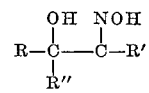

where R and R' are organic hydrocarbon radicals and R'' is selected from the group consisting of hydrogen and organic hydrocarbon radicals.

8. In a process as defined in claim 7 wherein the neutralizing agent is added to maintain the pH of the mixture between 2 and 4.

9. In a process as defined in claim 1 wherein the aqueous solution contains zinc values and the organic ion exchange extractant includes di-2-ethylhexyl phosphoric acid.

10. In a process as defined in claim 9 wherein the neutralizing agent is added to maintain the pH of the mixture between 2.0 and 2.5.

11. In a process as defined in claim 1 wherein the aqueous solution contains manganese values and the organic ion exchange extractant includes di-2-ethylhexyl phosphoric acid.

12. In a process as defined in claim 11 wherein the neutralizing agent is added to maintain the pH of the mixture between 4 and 5.

13. In a process as defined in claim 1 wherein the aqueous solution contains cobalt values and the organic ion exchange extractant includes 19-hydroxyhexatriaconta-9, 28-dien-18-oxime.

14. In a process as defined in claim 13 wherein the neutralizing agent is added to maintain the pH of the mixture at approximately 6.

15. In a process as defined in claim 1 wherein the aqueous solution contains nickel values and the organic ion exchange extractant includes 19-hydroxyhexatriaconta-9, 28-dien-18-oxime.

16. In a process as defined in claim 15 wherein the neutralizing agent is added to maintain the pH of the mixture at approximately 7.

References Cited

UNITED STATES PATENTS

| | | | |
|---|---|---|---|
| 3,211,521 | 10/1965 | George et al. | 75—121 |
| 3,224,873 | 12/1965 | Swanson | 75—101 |
| 3,251,646 | 5/1966 | Alon et al. | 75—121 |

OSCAR R. VERTIZ, Primary Examiner

H. S. MILLER, Assistant Examiner

U.S. Cl. X.R.

23—285; 75—117, 119, 120, 121; 260—429.9, 438.1, 439